UNITED STATES PATENT OFFICE.

ROCCO MUSOROFITI, OF NEW YORK, N. Y.

BREAD, &c., AND METHOD OF MAKING SAME.

SPECIFICATION forming part of Letters Patent No. 692,889, dated February 11, 1902.

Application filed May 7, 1901. Serial No. 59,107. (No specimens.)

*To all whom it may concern:*

Be it known that I, ROCCO MUSOROFITI, a citizen of the United States, residing in New York city, in the county of New York and State of New York, have invented certain new and useful Bread, &c., and Method of Making Same, of which the following is a specification.

This invention relates to a composition of matter and the process of making the same, and has for its object to provide a material out of which bread, crackers, biscuit, cakes, and all analogous articles may be made without flour, glucose, or any starchy element.

A further object of the invention is to provide a food especially desirable for invalids, particularly those suffering with diabetes or other kidney complaints, and infants and those who cannot digest starchy compounds.

This invention consists in a composition comprising nuts, eggs, and grease, and one form of it, which, if desired, may be the preferred form, comprises almonds, eggs, and butter, and in the process of compounding the same. In practice I have found that the best results are obtained by first pulverizing the almonds and then mixing such pulverized almonds, the yolks of the eggs, and the butter, and after thoroughly mixing these ingredients then adding the whites of the eggs, previously beaten, after which the whole is well beaten. I find that good results are obtained per pound by using one pound of pulverized white almonds, twenty eggs, and one-eighth of a pound of butter; but I desire to be understood that I do not limit myself to the proportions herein specified or to the particular manner in which the ingredients are compounded. Changes of detail may be made, more or less of certain elements found desirable in particular cases, and the elements compounded differently without departing from the principle or spirit of my invention, which is a composition out of which bread, crackers, biscuit, cakes, and analogous articles are made without flour, glucose, or other starchy compound. No yeast is used, and it is not necessary to wait for the composition to rise.

By the use of the above process a composition is produced from which bread, crackers, biscuit, cake, and analogous articles may be made, which are very light and attractive in appearance, very tempting in taste, and very nutritious, while at the same time easily digested and free from all starchy compounds.

I claim—

1. The herein-described process of preparing a food for invalids which consists in incorporating together pulverized almonds, yolks of eggs and butter, and after thorough mixture beating the whites of the eggs and mixing the same with the first-named ingredients.

2. A bread or the like obtained from the following ingredients in the ratio given, one pound pulverized white almonds, the yolks of twenty eggs, one-eighth pound of butter, and the well-beaten whites of twenty eggs, substantially as described.

ROCCO MUSOROFITI.

Witnesses:
FRED. J. DOLE,
C. E. VOSS.